(12) United States Patent
Rameshni

(10) Patent No.: US 7,067,101 B2
(45) Date of Patent: Jun. 27, 2006

(54) WATER WALL BOILER FOR AIR AND OXYGEN FIRED CLAUS SULFUR RECOVERY UNITS

(75) Inventor: Mahin Rameshni, Monrovia, CA (US)

(73) Assignee: WorleyParsons Group Inc., Arcadia, CA (US)

( * ) Notice: Subject to any disclaimer, the term of this patent is extended or adjusted under 35 U.S.C. 154(b) by 71 days.

(21) Appl. No.: 10/868,630

(22) Filed: Jun. 15, 2004

(65) Prior Publication Data

US 2004/0265213 A1 Dec. 30, 2004

Related U.S. Application Data

(60) Provisional application No. 60/482,908, filed on Jun. 25, 2003.

(51) Int. Cl.
C01B 17/02 (2006.01)
B01D 53/52 (2006.01)

(52) U.S. Cl. .................. 423/574.1; 423/220; 423/237; 423/576.8

(58) Field of Classification Search ............. 423/574.1, 423/574.2, 575, 576.8, 237, 238, 220, 573.1
See application file for complete search history.

(56) References Cited

U.S. PATENT DOCUMENTS

| | | | |
|---|---|---|---|
| 2,200,529 A * | 5/1940 | Baehr et al. ............. | 423/576.8 |
| 2,724,641 A * | 11/1955 | Butler et al. ................ | 423/576 |
| 2,834,655 A * | 5/1958 | Chute et al. ................ | 422/193 |
| 2,939,769 A * | 6/1960 | Webb .......................... | 422/200 |
| 3,057,698 A * | 10/1962 | Grekel et al. ................ | 422/202 |
| 3,393,050 A * | 7/1968 | Hunt et al. .................. | 423/576 |
| 3,752,877 A | 8/1973 | Beavon | |
| 4,038,036 A | 7/1977 | Beavon | |
| 4,395,390 A * | 7/1983 | Desgrandchamps et al. ........................ | 423/574.1 |
| 4,507,274 A * | 3/1985 | Broecker et al. ........ | 423/574.1 |
| 4,552,747 A | 11/1985 | Goar | |
| 4,575,453 A * | 3/1986 | Reed .......................... | 422/149 |
| 4,632,043 A * | 12/1986 | Pendergraft ................. | 110/345 |
| 4,632,818 A * | 12/1986 | Chen et al. .............. | 423/574.1 |
| 4,780,305 A | 10/1988 | Steppe | |
| 4,888,162 A * | 12/1989 | Brian ....................... | 423/574.1 |
| 5,139,765 A * | 8/1992 | Szekely ................... | 423/574.1 |
| 5,294,428 A | 3/1994 | Watson | |
| 6,508,998 B1 * | 1/2003 | Nasato ..................... | 423/573.1 |

OTHER PUBLICATIONS

Mahin Rameshni, "Equipment evaluation for oxygen enrichment revamps", Sulphur, No. 284, Jan.-Feb. 2003, pp. 43-47.*

Mahin Rameshni, "Economics of oxygen enrichment", Sulphur, No. 285, Mar.-Apr. 2003, pp. 39-42, 44-47.*

(Continued)

Primary Examiner—Stanley S. Silverman
Assistant Examiner—Ardith E. Hertzog

(57) ABSTRACT

The thermal combustion step of the modified Claus process is carried out in a water-wall boiler instead of a refractory-lined reaction furnace. The water-wall boiler replaces the conventional refractory-lined furnace and waste heat boiler when air, oxygen, or oxygen-enriched air is used as the oxidant. The acid gas combustion may be hydrogen sulfide-rich or hydrogen sulfide-lean with or without contaminants such as hydrocarbons and ammonia. Thermal combustion is performed in a single stage, without a recycle, for all levels of oxygen enrichment.

20 Claims, 1 Drawing Sheet

OTHER PUBLICATIONS

Section 5.2.3, "Boilers with integral combustion," p. 30 only of document entitled "Rice Husk Market Study," published 2003 (downloaded by examiner from http://www.dti.gov.uk/renewables/publications/pdfs/exp129.pdf on Mar. 7, 2006).*

Belin, F. T., et al., "A Boiler For Hydrogen Sulphide Combustion." Koks i Khimiya (Coke and Chemistry), vol. 6, pp. 52-55, 1971.*

* cited by examiner

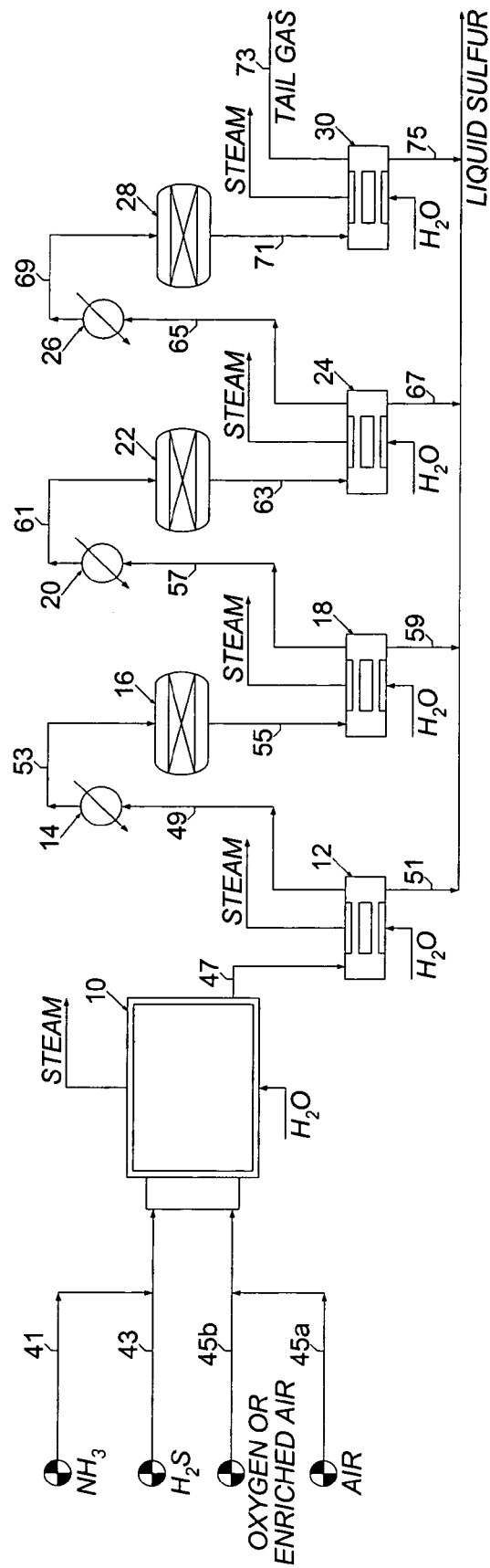

WATER WALL BOILER FOR AIR AND OXYGEN FIRED CLAUS SULFUR RECOVERY UNITS

CROSS REFERENCE TO RELATED APPLICATIONS

This application claims the benefit under 35 U.S.C. 119(e) of U.S. Provisional Patent Application No. 60/482,908 filed Jun. 25, 2003

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

The present invention relates to a process for recovering sulfur from hydrogen sulfide containing gases.

In the conventional sulfur plant, hydrogen sulfide rich gas are processed through the reaction furnace (combustion chamber) followed by the waste heat boiler. The water wall boiler replaces the reaction furnace (combustion chamber) and the waste heat boiler, while the remaining of the equipment stay the same.

It is known that the sulfur present in refinery crudes including natural gas exists as hydrogen sulfide or, in the initial processing steps, is converted in the main to hydrogen sulfide. The hydrogen sulfide, as part of the gas stream, is normally passed through an absorption system, such as an alkanolamine or a physical absorbent, which concentrates it and separates it from other components of the gas stream. The concentrated hydrogen sulfide gas stream is fed to a Claus plant wherein a portion of the hydrogen sulfide is combusted in the presence of oxygen introduced as air, oxygen, or oxygen-enriched air to form sulfur dioxide in proportions for the reaction:

$$2H_2S + SO_2 \rightarrow 3S + 2H_2O$$

As fast as sulfur dioxide is formed, it begins to react with hydrogen sulfide in the thermal reaction zone to form sulfur. Sulfur formed is condensed from the gas stream in a waste heat boiler and the balance of the gas stream, at the proper stoichiometric ratio of hydrogen sulfide to sulfur dioxide, is passed to one or more catalytic conversion zone(s), typically three, where additional sulfur is formed by the same reaction. As thermodynamics favor reaction at reduced temperatures, only a limited amount of conversion is achieved in each catalytic bed. The formed sulfur is recovered by condensation and the gas reheated for introduction to a following catalytic bed. The catalysts typically used are alumina or titanium. Conversion efficiencies of from 95% to 97% can be achieved in the Claus plant and, if pollution requirements so dictate, a clean-up operation such as that described in U.S. Pat. No. 3,752,877 to Beavon may be used to increase overall conversion to 99.9%-plus. This operation is also applicable in ammonia burning Claus sulfur plant as described in U.S. Pat. No. 4,038,036 to Beavon.

The oxygen required to convert the hydrogen sulfide to sulfur dioxide is usually supplied with air. This results in the introduction of approximately 79 volumes of nitrogen for every 21 volumes of oxygen needed for oxidation of the hydrogen sulfide. The nitrogen does not benefit the process and actually results in having to use larger and more expensive equipment in the Claus sulfur plant. The amount of nitrogen passing through the plant may be reduced by employing pure oxygen or oxygen enriched air. However, this results in higher temperatures in the Claus reaction furnace.

Temperatures in a Claus unit can reach up to 2800° F. (1538° C.) when air is used in the process and up to 5000° F. (2760° C.) when oxygen is used. A refractory lining insulates the walls of the unit from the high temperature inside of the unit for operation with air. Such refractory linings are undesirable because of the time and expense required to install the lining, the time required to heat the lining during start-up of the unit, the time required to cool the lining during shutdown of the unit, and the expense and lost on-stream time and sulfur production caused by damage to or failure of the lining, which requires that the unit be shut down for repairs.

For high level oxygen operation in the Claus unit, there are no practical refractories capable of withstanding the high temperatures produced in the furnace, therefore, a double combustion process, described in U.S. Pat. Nos. 5,294,428 and 4,780,305, or a recycle process, described in U.S. Pat. No. 4,552,747, is employed to moderate the temperature so that a refractory lining can be used. In the double combustion process, the reactions occur in two stages. Inter-stage cooling is employed in order to not exceed the temperature limit of the refractory. In the recycle process, a portion of the cooled effluent from the reaction furnace is recycled to the reaction furnace to moderate the temperature.

It would be beneficial to design a system to overcome the problems and limitations associated with refractory linings without resorting to two-stage combustion or recycle streams. A water-wall boiler is employed to resolve this limitation.

BRIEF SUMMARY OF THE INVENTION

According to the present invention, the thermal combustion step of the modified Claus process is carried out in a water-wall boiler. The water-wall boiler replaces the conventional refractory-lined reaction furnace and the waste heat boiler used in the modified Claus process when air, oxygen, or oxygen-enriched air is used as the oxidant. The acid gas combustion may be $H_2S$-rich or $H_2S$-lean with or without contaminants such as hydrocarbons and ammonia. Thermal combustion is performed in a single stage, without a recycle, for all levels of oxygen enrichment.

The water-wall boiler is designed with a radiant section, using water-wall tubes, capable of withstanding a bulk gas temperature of up to 5000° F. (2760° C.). Sufficient furnace volume is provided to achieve the residence time required for completion of the conversion reactions. A refractory-lined section may be employed to hold the temperature at a desired level to complete the conversion reactions. The combustion products are cooled to about 650° F. (343° C.)

in the convection section of the water-wall boiler. The water-wall boiler may produce saturated and/or superheated steam.

The water-wall boiler eliminates problems associated with refractory maintenance. Fast boiler startup and heating rates are not concern with water-wall designs. The entire furnace expands and contracts uniformly as a unit. This eliminates relative expansion problems that occur at the interfaces between water-cooled walls and refractory casing. For a given volume, the water-wall boiler has lower furnace area heat release rates and heat fluxes because the front and rear water cooled walls provide additional effective surface area.

This invention can be used for new Claus plants as well as for the revamp of existing Claus units for air and/or oxygen operation.

BRIEF DESCRIPTION OF THE DRAWING

The drawing is a schematic diagram illustrating a Claus sulfur recovery unit employing a water-wall boiler for the thermal combustion step.

DETAILED DESCRIPTION OF THE INVENTION

Oil and gas-fired packaged steam generators are widely used in chemical plants, refineries and cogeneration systems. Custom-designed steam generators for modified Claus sulfur plants are considered where the feed gas is a hydrogen sulfide rich feed gas stream, is increased by combusting hydrogen sulfide in one stage with an oxidant which is an oxygen rich gas stream comprised of air, oxygen or a mixture of air and oxygen.

The boiler is designed as a furnace to achieve the proper combustion with minimum pressure drop by adjusting the boiler height, tube spacing, tube counts, high efficiency, low operating cost, proper material selection and without flame impingement concerns. The water-wall boiler replaces the conventional refractory-lined reaction furnace and waste heat boiler.

The water-wall boiler can be designed with partial or no refractory depending on the application and the maximum combustion temperature for any Claus unit air operation or any combination of air plus oxygen enrichment for lean and rich acid gases with or without ammonia burning in one combustion chamber. The water-cooled furnace could be used in any new sulfur plant design where the units operates on air or oxygen enrichment or any combination of air plus oxygen instead of conventional reaction furnace. The water-wall furnace can be used in any revamp sulfur unit where there is a need for increasing capacity up to 250% by replacing the existing reaction furnace and waste heat boiler with a new water-wall boiler, which is capable of achieving up to 5000° F. (2760° C.) combustion temperature. The remaining existing equipment could be kept in place without any modification if they are sized properly. Some of the existing sulfur plant have space limitation for additional new equipment, using water cooled boiler will help with space restrictions at the plants.

The water-cooled furnace has several advantages as follows: The furnace front, rear, side walls and floor are completely water-cooled and are of membrane wall construction, resulting in a leak proof enclosure for the flame. The entire furnace expands and contracts uniformly avoiding casing expansion problems. The current refractories commonly used in sulfur plants are limited to 3000° F.

(1650° C.) combustion temperature, where oxygen used there is a need for intermediate cooling in stages or to provide cooled recycle gas to protect the refractory lining. Using water cooled furnace will eliminate the refractory limitation for oxygen enrichment processes as well as other problems such as corrosion, maintenance, rate of the startup will be eliminated for the normal air operation. Heat-releases on a boiler water-tube are lower compared to a refractory-lined unit, which has less cooling surface, and results in reduced heat flux. The refractory increases the flame's local combustion as the results of re-radiation. Finally, the water wall boiler will reduce the furnace exit temperature, which helps lowering the radiant heat flux and tube failures. In a natural circulation boiler, tubes are vertical and the gas flows horizontally. Natural circulation moves the steam-water mixture through the evaporator tubes, where the gas temperature is low act as downcomer tubes, while the rest of the tubes in the radiant and convection section act as risers carrying the steam-water mixture to the steam drum. Steam temperatures could be controlled using an inter-stage de-superheater or a spray attemperator, which injects water into steam to control its temperature.

The membrane wall design, which acts as a gas tight enclosure for the flue gases and also minimizes problems associated with thermal expansion and movement of the various parts of the furnace. In the membrane wall design, the entire furnace operates at a uniform temperature, so all the combustible components are reacted and differential expansion is minimal. The size of the tube and pitch are optimized depends on generation of low or high-pressure steam. CO formation could be reduced by using water cooled boiler instead of conventional furnace.

Referring to the drawing, amine acid gas (43) and ammonia acid gas (41) enter the sulfur recovery unit. The acid gas is partially oxidized with air (45*a*) and/or oxygen (45*b*) in the water-wall boiler (10) according to the basic chemistry of the Claus process, which is described by the following principal reactions:

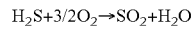

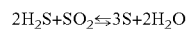

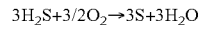             OVERALL

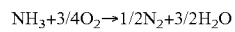

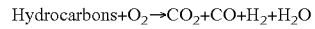

The sulfur is formed as a vapor, and other forms of elemental sulfur are formed in the gas. The predominant reactions producing the other forms are:

Since the reactions are exothermic, heat is recovered in the water wall boiler by introducing boiler feed water to produce steam and the combusted gas is cooled prior of entering the first condenser.

The combusted gas stream (47) is routed to No. 1 condenser for further cooling. The condensed sulfur stream (51) is drained to a sulfur pit. The outlet gas stream (49) from the No. 1 condenser (12) is heated indirectly in the No. 1 reheater (14) with steam and then stream (53) enters the No. 1 converter (16) which contains an alumina catalyst, where the reaction to form sulfur from $H_2S$ and $SO_2$ continues. Sulfur is formed by an exothermic reaction and the heat generated is proportional to the amount of sulfur produced across the catalyst bed. The converter effluent stream (55) is cooled in the No. 2 Condenser (18) by generating low-pressure steam and the condensed sulfur stream (59) is drained to a sulfur pit. Since the conversion to sulfur described in equation is favored by low temperature, but produces heat as it occurs, the reaction is carried out in several stages to give the desired sulfur recovery. A portion of the conversion takes place in the reaction furnace at high temperature. Additional conversion takes place in contact with a catalyst at much lower temperatures with an accompanying temperature rise. Sulfur is condensed and removed from the hot vapors after each conversion stage. The amount of sulfur recovered from each successive stage decreases because of the reduction in the concentrations of $H_2S$ and $SO_2$ in the gas stream. Conversion is further limited by the increasing concentration of water vapor resulting from the conversion reaction. The conversion reaction in the catalyst reactors improves as the reaction temperature is lowered, but the reactor must remain safely above the sulfur dew point temperature to avoid condensing-sulfur on the catalyst. The recovery of liquid sulfur after each catalyst reactor is favored by low-condenser outlet temperature. The vapor stream leaving each condenser must be reheated to a temperature high enough to prevent sulfur condensation in the next catalyst bed.

Similarly, for the second stage, the gas stream (57) from condenser No. 2 (18) is reheated indirectly, in the No. 2 rehaeter (20) with steam. The stream (61) enters the converter No. 2(22). Sulfur is also formed in the converter No. 2 (22). The converter No. 2 effluent stream (63) is cooled in condenser No. 3 (24), and the condensed sulfur stream (67) is drained to a sulfur pit. Similarly, for the third stage, the gas stream (65) from the condenser No. 3 (24) is reheated indirectly, in the No. 3 reheater (26) with steam. The stream (69) enters the converter No. 3(28). Sulfur is also formed in the converter No. 3 (28). The converter No. 3 effluent stream (71) is cooled in condenser No. 4 (30), and the condensed sulfur stream (75) is drained to a sulfur pit. The tail gas stream (73) exits from the condenser No. 4.

As used herein by the term "hydrgen sulfide rich gas streams" there is meant the mixture of two gas streams, one stream containing at least about 10% by volume hydrogen sulfide to 100% by volume of hydrogen sulfide, and the other containing hydrogen sulfide and an ammonia content of zero to 50% by volume.

The use of water wall boiler is effective for a hydrogen sulfide rich gas stream containing at least about 10% by volume hydrogen sulfide, preferably 50 to 100% by volume hydrogen sulfide. Hydrogen sulfide rich gas stream may contain ammonia where the hydrogen sulfide is less than 100% by volume.

The oxygen required to convert the hydrogen sulfide to sulfur dioxide is usually supplied with air with 79% volume of nitrogen for every 21 volumes of oxygen. The oxygen rich stream contains at least about 15% by volume of oxygen, preferably 21% to 100% volume of oxygen.

As used herein by the term "at least 50 pounds per square inch" there is meant that the water wall boiler generates at least 50 pounds per square inch of steam as the results of combustion reaction. As used herein by the term "250 to 750 pounds per square inch of steam" there is meant that the water wall boiler will generate the high pressure steam in the range listed upon using oxygen rich stream and hydrogen sulfide rich gas stream where steam is superheated at least 25° F. above its saturation temperature.

In the water wall boiler the amount of hydrogen sulfide rich gas stream and oxygen are proportioned to provide a mole ratio of 2:1 to 5:1 of hydrogen sulfide to sulfur dioxide on completion of combustion.

In the water wall boiler the hydrogen sulfide rich gas stream could be introduced in one of four locations.

The Claus reaction which occurs in the conventional single combustion chamber or SURE double combustion chamber is limited by the maximum working temperature of the refractory when air, oxygen or oxygen-enriched air is used as the oxident. The water wall boiler replaces the conventional refractory lined combustion chamber (reaction furnace) and the waste heat boiler when air, oxygen or oxygen-enriched air is used as the oxident, where the combustion product (effluent gas) cools by generating steam through membrane of the water wall boiler. Therefore the effluent gas temperature from the water wall boiler after being cooled inside is between about 500° F. and 3000° F.

I claim:

1. In a process for the production of sulfur by reaction of hydrogen sulfide and sulfur dioxide where a feed of hydrogen sulfide is partially oxidized to sulfur dioxide to form reactants which yield sulfur by the catalytic Claus reaction, the improvement which comprises combustion of at least a portion of a hydrogen sulfide rich gas stream containing at least about 10% by volume hydrogen sulfide with an oxygen rich stream containing at least about 15% by volume oxygen in a water wall boiler which generates steam at a pressure of at least about 50 pounds per square inch.

2. The process as claimed in claim 1 in which the oxygen rich stream is air.

3. The process as claimed in claim 1 in which the oxygen rich stream has an oxygen content of 21 to 100% by volume.

4. The process as claimed in claim 1 in which the hydrogen sulfide rich gas stream has a hydrogen sulfide content of 50 to 100% by volume.

5. The process as claimed in claim 1 in which the hydrogen sulfide rich gas stream has an ammonia content of zero to 50% by volume.

6. The process as claimed in claim 1 in which the steam is generated at a pressure of between 250 pounds per square inch and 750 pounds per square inch and is superheated at least about 25° F. (14° C.) above its saturation temperature.

7. The process as claimed in claim 1 in which the amount of hydrogen sulfide rich gas and oxygen rich gas fed to the water-wall boiler are proportioned to provide, on completion of combustion, a gas stream having a mole ratio of hydrogen sulfide to sulfur dioxide of about 2:1 to 5:1.

8. The process as claimed in claim 1 in which the hydrogen sulfide rich gas stream is introduced to the water wall boiler in 1 to 4 locations.

9. The process as claimed in claim 1 in which the effluent gas from the water-wall boiler is between about 500° F. (260° C.) and 3000° F. (1649° C.).

10. The process as claimed in claim 1 in which a portion of the water-wall boiler is refractory lined to hold the gas temperature at a desired level.

11. In a process for the production of sulfur by reaction of hydrogen sulfide and sulfur dioxide where a feed of hydrogen sulfide rich gas streams containing hydrogen sulfide and ammonia are partially oxidized to sulfur dioxide to form reactants which yield sulfur by the catalytic Claus reaction, the improvement which comprises combustion of at least a portion of a hydrogen sulfide rich gas stream containing at least about 10% by volume hydrogen sulfide with an oxygen rich stream containing at least about 15% by volume oxygen in a water wall boiler which generates steam at a pressure of at least about 50 pounds per square inch.

12. The process as claimed in claim 11 in which the oxygen rich stream is air.

13. The process as claimed in claim 11 in which the oxygen rich stream has an oxygen content of 21 to 100% by volume.

14. The process as claimed in claim 11 in which the hydrogen sulfide rich gas stream has a hydrogen sulfide content of 50 to 100% by volume.

15. The process as claimed in claim 11 in which the hydrogen sulfide rich gas streams have an ammonia content of zero to 50% by volume.

16. The process as claimed in claim 11 in which the steam is generated at a pressure of between 250 pounds per square inch and 750 pounds per square inch and is superheated at least about 25° F. (14° C.) above its saturation temperature.

17. The process as claimed in claim 11 in which the amount of hydrogen sulfide rich gas streams containing ammonia and hydrogen sulfide rich gas, and oxygen rich gas fed to the water-wall boiler are proportioned to provide, on completion of combustion, a gas stream having a mole ratio of hydrogen sulfide to sulfur dioxide of about 2:1 to 5:1.

18. The process as claimed in claim 11 in which the hydrogen sulfide rich gas stream is introduced to the water wall boiler in 1 to 4 locations.

19. The process as claimed in claim 11 in which the effluent from the water-wall boiler is between about 500° F. (260° C.) and 3000° F. (1649° C.).

20. The process as claimed in claim 11 in which a portion of the water-wall boiler is refractory lined to hold the gas temperature at a desired level.

* * * * *